3,151,123
ACID-SOLUBLE CHLOROPHYLLINS AND THEIR PRODUCTION

Remsen T. Schenck, Bangor, and August J. Buzas, Bethlehem, Pa., assignors to Keystone Chemurgic Corporation, Bethlehem, Pa., a corporation of Pennsylvania
No Drawing. Filed June 19, 1962, Ser. No. 203,469
5 Claims. (Cl. 260—314)

This invention relates to processes for preparing chlorophyllins which are soluble in aqueous media over a wide range of pH, and to the water-soluble chlorophyllins thereby obtained.

The water-soluble chlorophyllins of commerce are prepared by saponification of natural chlorophyll extracted from various plant sources. In this process two ester linkages are hydrolyzed to free carboxyl groups. A peripheral cyclopentanone ring is also opened, to generate a third free carboxyl group. The resulting tribasic acid reacts with alkali metal hydroxides to form sodium or potassium salts.

These chlorophyllins may be used as the magnesium complexes, as found in nature. The magnesium may alternatively be replaced by other metals, as copper or iron, both to increase the stability of the product and to intensify the color.

The water-solubility of the aforesaid chlorophyllins is due to the alkali metal carboxylate salt groups. This property is manifested only in alkaline solution, however. The carboxyl groups are only weakly acidic, and stable salts are formed only with strongly basic metals. Aqueous solutions of the salts are therefore alkaline. Any attempt to neutralize them merely causes reversion to the free carboxylic acid, with precipitation of the chlorophyllin.

Chlorophyllins are also soluble in mineral acid, since the porphyrin nucleus is basic. Its basicity is very feeble, however, and comparatively high concentrations of acid are required to effect solution. Acid-solubility is observed only in strong acids of concentration greater than one-half normal (pH below 1).

Many potential applications of chlorohyllins involve neutral or weakly acidic solutions. It has heretofore been impossible to use chlorophyllins in such a preparation, since they are soluble only at a pH above 9 or below 1.

It is an object of the present invention, therefore, to provide chlorophyllins which are freely soluble in water at any pH, acid, neutral or basic, and which may be employed in the aforementioned applications, as well as in those where ordinary chlorophyllins presently find usage. It is a further object of the invention to provide a process for producing the aforesaid freely soluble chlorophyllins.

In accordance with the method of the present invention, the foregoing objects as well as still further objects are accomplished in the preparation of our modified chlorophyllins by taking advantage of the fact that alkali metal salts of weak acids react with sultones to form sulfonated esters. The free carboxyl groups of the chlorophyllin are thus reconverted to ester linkages, as in the original chlorophyll, and an equivalent number of sulfonic acid groups are introduced into the molecule. Unlike carboxylic acids, sulfonic acids are strong acids, and do not revert to an undissociated, water-insoluble form in acid media. The presence of a sulfonate group in a molecule thus imparts water-solubility which is independent of pH. It is common practice, particularly in the dyestuffs industry, to prepare water-soluble derivatives by direct sulfonation, or by use of sulfonated intermediates. These procedures are not applicable to chlorophyllins, however, as the molecule cannot be directly sulfonated without destroying its desirable properties. The necessary sulfonate groups must be introduced indirectly, under very mild conditions, as in our novel process.

A sultone is the inner ester of a hydroxysulfonic acid of appropriate orientation, corresponding to the lactone of a hydroxycarboxylic acid. Several examples, among them propane sultone (the sultone of 3-hydroxypropane sulfonic acid), butane sultone (the sultone of 4-hydroxybutane sulfonic acid) and tolyl sultone (the sultone of benzyl alcohol ortho-sulfonic acid), are commercially available. The reaction between a sultone and the alkali metal salt of a carboxylic acid may be carried out in the absence of a solvent, simply by heating an intimate mixture of the two reactants in the correct proportions. Alternatively, an appropriate solvent may be used to afford better control over the reaction and to improve the contact between the reactants.

While it is posible to operate without a solvent in effecting the condensation of a sultone with a sodium or potassium chlorophyllin, this technique has its drawbacks. Only the sultone is liquid at the temperature of reaction, so that adequate mixing is difficult to attain. The usual solvents, lower aliphatic alcohols and liquid aromatic hydrocarbons, are also unsuitable. Chlorophyllins are only slightly soluble in the former, and insoluble in the latter. As a result, reaction occurs on the surface of the suspended particles and coats them with a layer of insoluble product. The interior of each particle is thus protected from further attack, and the reaction fails to reach completion.

The reaction herein described is preferentially conducted in a nonsolvolytic liquid which is a solvent for both reactants and for the reaction product as well. Suitable liquids are dimethyl formamide, dimethyl acetamide, and dimethyl sulfoxide. By these means the system is made homogeneous, and this in turn permits the reaction to go to completion with formation of a minimum of by-products.

Sultones do not condense with alkali metal carboxylates at ordinary temperatures. The reaction first becomes noticeable at about 65–80° C.; while it can be carried out in this temperature range, the time required is unduly long. At 140–150° C. the reaction is essentialy instantaneous; this temperature results in some degradation of the chlorophyllin, however. We prefer to work in the neighborhood of 110–120° C., a compromise which affords a convenient rapidity of reaction and has only a negligibly deleterious effect on the chlorophyllin.

The alkali metal chlorophyllins of commerce are not pure substances. Their purity, as determined photometrically, may vary over a wide range. It is, therefore, not feasible to calculate the proportions of sultone and chlorophyllin to be used in the reaction by stoichiometric methods alone. There is a direct relationship, however, between alkali metal and sultone, and it is thus possible to determine the correct proportions of the reactants from the potassium and/or sodium content of the chlorophyllin. Suitable amounts of propane sultone are 2.9 gm. per gram of potassium, or 4.8 gm. per gram of sodium, in the chlorophyllin to be treated. For butane sultone the corresponding quantities are 3.2 gm. per gram of potassium and 5.3 gm. per gram of sodium. These ratios are approximately 90% of the theoretical, to allow for the possibility that some of the alkali metal in the chlorophyllin is present as an inorganic salt.

The products of this reaction are similar to the starting material in being very soluble in water to afford intensely green solutions. They differ in that the resulting solutions are neutral rather than strongly basic, and that no precipitation occurs on addition of either acid or alkali. In very strongly acidic or basic solution a slow hydrolysis takes place, leading to precipitation in the former case and to regeneration of the starting chlorophyllin in the latter. For instance, at pH 1 precipitation occurs after one week; at pH 2 the solution remains clear for about 3 months; at pH 3 to 11 it is stable for an indefinite period.

*Example 1*

Ninety gm. of potassium copper chlorophyllin, of 95.5% "potency" and 11.5% potassium content, is stirred into 900 cc. of dimethyl formamide at room temperature until no lumps remain. After adding 30 gm. propane sultone, the mixture is heated, under stirring, to 110–120° C. and held at this temperature for 20–30 minutes. Dimethyl formamide is then completely distilled off under reduced pressure, until only a dry, dark green solid remains in the distillation vessel. This is dissolved in 1200 cc. of water and the solution is filtered to remove a trace of insoluble solid. The faintly acid filtrate is neutralized to pH 7 with dilute KOH solution, using a pH meter and a calomel cell-glass electrode system. It is then spray-dried. The product is 110–120 gm. of a greenish-black powder, very soluble in water to give a neutral solution, and not precipitated by the addition of either acid or base. Analysis gives the following results:

| | Percent |
|---|---|
| "Potency" (photometrically, as copper chlorophyllin) | 49 |
| Nitrogen | 4.7 |
| Copper | 3.3 |
| Potassium | 8.8 |

*Example 2*

Sixty gm. of sodium copper chlorophyllin, of 97% "potency" and 6.5% sodium content, is dispersed in 600 cc. of dimethyl formamide and heated with 19 gm. of propane sultone as in Example 1. After removal of the solvent, the residue is dissolved in 800 cc. of water, filtered, and the filtrate is neutralized with NaOH and spray-dried. There is obtained approximately 75 gm. of product having the following composition:

| | Percent |
|---|---|
| "Potency" | 48 |
| Nitrogen | 4.9 |
| Copper | 3.4 |
| Sodium | 5.3 |

*Example 3*

Twenty gm. of potassium copper chlorophyllin, of 92.4% "potency" and 10.8% potassium content, is stirred into 200 cc. of dimethyl formamide and heated with 7 gm. of butane sultone as in Example 1. The solvent is evaporated, the residue is dissolved in 250 cc. of water and filtered. After neutralizing with KOH, the filtrate is spray-dried to give about 25 gm. of material with the following analysis:

| | Percent |
|---|---|
| "Potency" | 47 |
| Nitrogen | 4.2 |
| Copper | 2.7 |
| Potassium | 8.0 |

*Example 4*

The procedure of Example 3 is followed, using 200 cc. of dimethyl acetamide as solvent. The product is identical in all respects with that obtained in Example 3.

The process defined in the foregoing examples can be applied equally well to other types of chlorophyllin. Sodium or potassium iron chlorophyllin, for instance, can by this method be similarly converted to a form which is soluble in neutral or slightly acid aqueous media. Other sultones, such as tolyl sultone, may be substituted; propane and butane sultones are, however, the reagents of choice.

The process of our invention is not limited to the exact details of procedure and conditions outlined in the foregoing examples, which are given merely for purposes of illustration, and it will be appreciated that equivalent steps and chemicals may be utilized without departing from the spirit and scope of the invention. For example, departures may be made in both materials and processes with respect to the specific components of the composition, and the percentages and proportions thereof, as well as the specified steps and type of process, all without departing from the spirit and scope of this invention as defined in the appended claims.

Having thus described the invention, we claim:

1. In a process of preparing a freely soluble chlorophyllin, the step which comprises reacting at a temperature not less than about 65° C., an alkali metal salt of a metal chlorophyllin selected from the group consisting of copper, magnesium and iron chlorophyllins, with the sultone of an unsubstituted lower aliphatic sulfoalcohol, said sultone being present in an amount not greater than stoichiometrically sufficient to combine with substantially all of the organically combined alkali metal present in said alkali metal salt, said reaction being conducted in the presence of a non-solvolytic ionizing solvent selected from the group consisting of dimethyl formamide, dimethyl acetamide and dimethyl sulfoxide.

2. The process of claim 1 wherein said alkali metal chlorophyllin is selected from the group consisting of potassium copper chlorophyllin and sodium copper chlorophyllin.

3. The process of claim 1 wherein said sultone is selected from the group consisting of propane sultone, butane sultone and tolyl sultone.

4. The process defined in claim 1 wherein said temperature is within the range of about 110–120° C.

5. Water- and acid-soluble chlorophyllin prepared by the reaction at a temperature not less than about 65° C. between an alkali metal salt of a metal chlorophyllin selected from the group consisting of copper, magnesium and iron chlorophyllins, and the sultone of an unsubstituted saturated lower aliphatic sulfoalcohol in an ionizing, non-solvolytic solvent selected from the group consisting of dimethyl formamide, dimethyl acetamide and dimethyl sulfoxide.

References Cited in the file of this patent

UNITED STATES PATENTS

| 2,005,511 | Stoll et al. | June 18, 1935 |
| 2,888,486 | Gregory | May 26, 1959 |
| 2,907,786 | Gundel | Oct. 6, 1959 |
| 2,971,024 | Zaugg et al. | Feb. 7, 1961 |

FOREIGN PATENTS

| 764,340 | Great Britain | Dec. 28, 1956 |

OTHER REFERENCES

Helberger et al.: Chem. Abstracts, vol. 50 (1956), page 10129.

Helberger et al.: Chem. Abstracts, vol. 44 (1950), pages 1892 and 1893.